S. C. SHERRY.
NON-SLIP ATTACHMENT.
APPLICATION FILED MAR. 10, 1920.
1,359,439.
Patented Nov. 16, 1920.
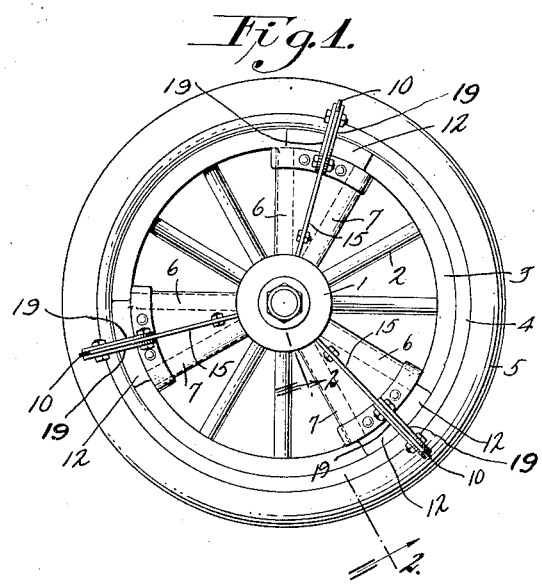
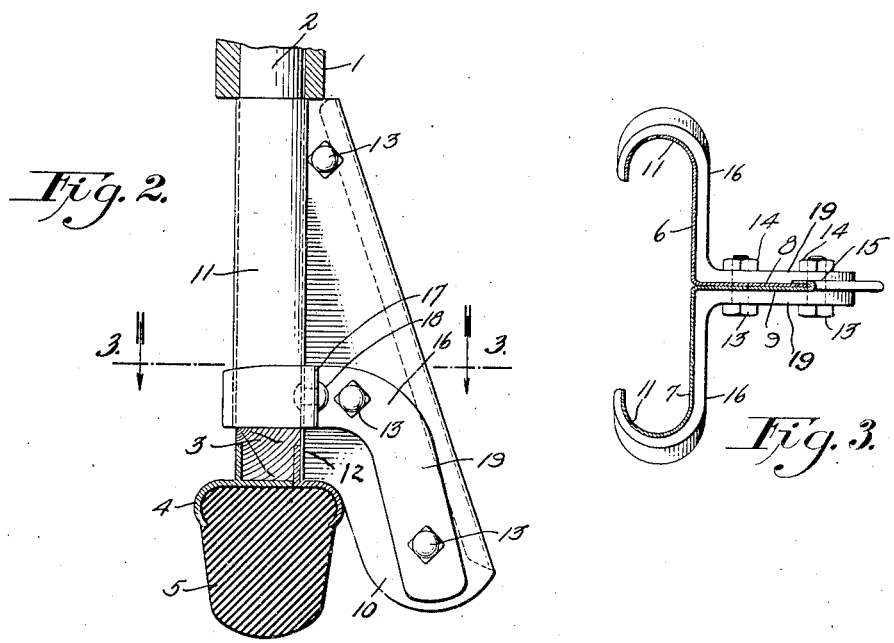
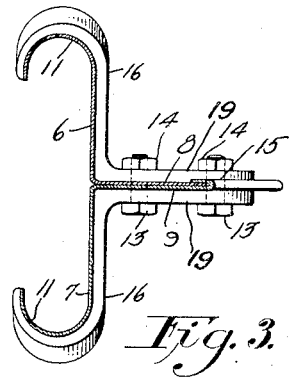
WITNESSES:
INVENTOR
S. C. SHERRY,
BY
ATTORNEYS

UNITED STATES PATENT OFFICE.

SOL C. SHERRY, OF WEST ENGLEWOOD, NEW JERSEY.

NON-SLIP ATTACHMENT.

1,359,439.　　　　Specification of Letters Patent.　　Patented Nov. 16, 1920.

Application filed March 10, 1920. Serial No. 364,806

*To all whom it may concern:*

Be it known that I, SOL C. SHERRY, a citizen of the United States, and a resident of West Englewood, in the county of Bergen and State of New Jersey, have invented a new and Improved Non-Slip Attachment, of which the following is a full, clear, and exact description.

This invention relates to improvements in non-slip attachments, an object of the invention being to provide an attachment or attachments for the drive wheels of trucks or other automobiles which will prevent slipping of the wheels in snow and mud and hence, prevent stalling of the cars.

A further object is to provide a non-slip device which can be readily attached to the drive wheel or drive wheels of a car and which will provide a laterally and radially projecting web to take hold in snow or mud and facilitate the traction of the wheel.

A further object is to provide a device of the character stated which can be readily connected and disconnected by any one of average intelligence and which can be manufactured and sold at a reasonably low price.

With these and other objects in view the invention consists in certain novel features of construction, and combinations and arrangements of parts as will be more fully hereinafter described and pointed out in the claims.

In the accompanying drawings—

Figure 1 is a view in side elevation illustrating a wheel provided with my improved devices;

Fig. 2 is an enlarged view in section on the line 2—2 of Fig. 1; and

Fig. 3 is a view in section on the line 3—3 of Fig. 2.

1 represents the hub, 2 the spokes, and 3 the felly of an ordinary wheel. 4 is the rim fixed to the felly and 5 the tire mounted in the rim. I have illustrated an ordinary type of drive wheel which is employed on trucks and other automobiles and my invention is particularly adapted for use on such wheels, although, of course, I do not limit myself to any particular use.

My improved device comprises two members 6 and 7, both composed of relatively heavy, strong sheet metal and both having at their inner edges outwardly projecting webs 8 and 9 respectively located side-by-side when in position on the wheel and projecting laterally from the wheel and also projecting outwardly or radially as shown at 10, to form a web or blade adapted to engage the snow or mud and give the wheel a traction or grip to propel the vehicle.

The outer edges of the members 6 and 7 are curved inwardly, as shown at 11, to fit around the spokes 2 of the wheel and these edges 11, 11, incline or taper from their inner to their outer ends so that the attachment as a whole is of general triangular or tapering form so as to snugly fit around two adjacent spokes. The members 6 and 7 are of a length to fit snugly between the hub 1 and the felly 3 and are made with tongues 12 which rest against the outer face of the felly so that the device can be rigidly secured to the wheel and held against movement in all directions when bolts 13 are positioned through the webs 8 and 9 and secured by means of nuts 14. The inwardly curved portions 11 of the members 6 and 7, therefore, rest against the inner face of the felly and the outer face of the hub forming extended bearing surfaces to strengthen the connection of the parts.

The outer edge of the web 9 is preferably turned over and inwardly forming a lip 15 which receives the outer edge of the web 8 and forms a strengthening means. This lip 15 is of such a length or taper that the web 8 can be inserted under the same when the two members are at a slight angle to each other which is the normal position of the parts when locking the device on the spokes of a wheel, so that as the curved portions 11 are forced around the spokes, the outer edge of the web 8 will move under the lip 15.

The members 6 and 7 and their webs 8 and 9 are strengthened by bars 16 which have relatively straight portions 17 secured by rivets or other suitable connecting devices 18 to the members 6 and 7, and these bars 16 are made with outwardly and radially projecting portions 19 which have openings receiving the bolts 13 above referred to. It is, of course, possible that the members 6 and 7 may be constructed of a material sufficiently strong to prevent the necessity of the use of the bars 16, but in most cases I believe it is preferable to provide these bars to resist the strains to which the webs are necessarily subjected.

While, of course, I do not limit myself to any particular number of these devices, I believe that three equally spaced on a wheel, as shown in Fig. 1, would be a preferred arrangement and would produce the results desired.

In operation, the extensions 10 of the webs 8 and 9 will project into the snow or mud and operate as blades or vanes to give the wheel a grip and permit a drive of the vehicle, hence preventing slipping which so often occurs when a vehicle is used in snow and mud.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A device of the character described, comprising a pair of members, each member having a curved portion at its edge adapted to be positioned around the spoke of a wheel, webs projecting outwardly from the members, and devices securing the webs together.

2. A device of the character described, comprising a pair of members, each member having a curved portion at its edge adapted to be positioned around the spoke of a wheel, webs projecting outwardly from the members, and devices securing the webs together, said members of a length to fit between the hub and felly of a wheel.

3. A device of the character described, comprising a pair of members, each member having a curved portion at its edge adapted to be positioned around the spoke of a wheel, webs projecting outwardly from the members, devices securing the webs together, and an inwardly projecting lip on the outer edge of one of said webs inclosing the outer edge of the other web.

4. A device of the character described, comprising a pair of members, each member having a curved portion at its edge adapted to be positioned around the spoke of a wheel, webs projecting outwardly from the members, and devices securing the webs together, said webs having outwardly and radially projecting extensions adapted to be positioned beside the tire of a wheel.

5. A device of the character described, comprising a pair of members, each member having a curved portion at its edge adapted to be positioned around the spoke of a wheel, webs projecting outwardly from the members, devices securing the webs together, strengthening bars located against the outer faces of the members and their webs, and bolts securing said parts together.

6. The combination with a wheel having a hub, a felly, a rim on the felly, a tire on the rim, and spokes connecting the hub and the felly, of a non-slip device engaging two spokes of the wheel and located between the hub and the felly, tongues on the non-slip device located against the outer face of the felly, and a web on the non-slip device extending outwardly and radially and positioned beside the tire.

SOL C. SHERRY.